US010179534B2

(12) United States Patent
Hoshino (10) Patent No.: US 10,179,534 B2
(45) Date of Patent: Jan. 15, 2019

(54) VEHICLE LIGHTING APPARATUS

(71) Applicant: STANLEY ELECTRIC CO., LTD., Tokyo (JP)

(72) Inventor: Shinya Hoshino, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/829,656

(22) Filed: Dec. 1, 2017

(65) Prior Publication Data
US 2018/0154819 A1    Jun. 7, 2018

(30) Foreign Application Priority Data
Dec. 7, 2016   (JP) .................. 2016-237432

(51) Int. Cl.
*G03B 21/28*    (2006.01)
*H04N 9/31*    (2006.01)
(Continued)

(52) U.S. Cl.
CPC ............... *B60Q 1/04* (2013.01); *B60Q 1/085* (2013.01); *B60Q 1/50* (2013.01); *F21S 41/147* (2018.01); *F21S 41/16* (2018.01); *F21S 41/25* (2018.01); *F21S 41/255* (2018.01); *F21S 41/265* (2018.01); *F21S 41/336* (2018.01); *F21S 41/36* (2018.01); *F21S 41/365* (2018.01); *F21S 41/675* (2018.01); *G02B 5/10* (2013.01); *G02B 13/16* (2013.01); *G03B 21/147* (2013.01); *G03B 21/28* (2013.01); *G03B 29/00* (2013.01); *B60Q 2300/42* (2013.01); *B60Q 2300/45* (2013.01); *B60Q 2400/50* (2013.01)

(58) Field of Classification Search
CPC ...... G03B 21/28; G03B 21/14; G03B 21/008; G03B 21/147; H04N 9/3141; H04N 9/317; H04N 9/3173
USPC ................................................ 353/13, 98, 99
See application file for complete search history.

(56) References Cited

U.S. PATENT DOCUMENTS

| 5,281,815 A | 1/1994 | Even-Tov |
| 2015/0029474 A1* | 1/2015 | Tatsuno .................. G03B 21/28 353/97 |
| 2016/0090023 A1 | 3/2016 | Asaoka |

FOREIGN PATENT DOCUMENTS

| DE | 102012024494 A1 | 6/2014 |
| JP | 4059079 B | 3/2008 |

(Continued)

OTHER PUBLICATIONS

Japanese Office Action for the related Japanese Patent Application No. 2016-237432 dated Feb. 6, 2018.
(Continued)

*Primary Examiner* — Ryan D Howard
(74) *Attorney, Agent, or Firm* — Kenealy Vaidya LLP (57) ABSTRACT

A vehicle lighting apparatus that emits light diagonally toward a road surface from a vehicle includes: a light source; an image generation part that modulates light emitted from the light source and that generates an image; a light-focusing optical system that focuses light having the image generated by the image generation part; and a reflection part that reflects light focused by the light-focusing optical system toward the road surface, wherein the reflection part has a reflection surface having a curvature that is gradually increased from a projection direction rearward side toward a projection direction frontward side.

7 Claims, 7 Drawing Sheets

(51) Int. Cl.
    *B60Q 1/04*     (2006.01)
    *G03B 21/14*     (2006.01)
    *G02B 13/16*     (2006.01)
    *F21S 41/36*     (2018.01)
    *F21S 41/25*     (2018.01)
    *F21S 41/675*     (2018.01)
    *G02B 5/10*     (2006.01)
    *B60Q 1/08*     (2006.01)
    *B60Q 1/50*     (2006.01)
    *F21S 41/147*     (2018.01)
    *F21S 41/255*     (2018.01)
    *F21S 41/265*     (2018.01)
    *F21S 41/33*     (2018.01)
    *F21S 41/16*     (2018.01)
    *F21S 41/365*     (2018.01)
    *G03B 29/00*     (2006.01)

(56) References Cited

FOREIGN PATENT DOCUMENTS

| | | |
|---|---|---|
| JP | 2015-164828 A | 9/2015 |
| JP | 2016-107761 A | 6/2016 |
| WO | 2015/193996 A1 | 12/2015 |
| WO | 2016/051490 A1 | 4/2016 |

OTHER PUBLICATIONS

Extended European Search Report for the related European Patent Application No. 17205347.2 dated May 28, 2018.

* cited by examiner

VEHICLE LIGHTING APPARATUS

CROSS-REFERENCE TO RELATED APPLICATION

Priority is claimed on Japanese Patent Application No. 2016-237432, filed on Dec. 7, 2016, the contents of which are incorporated herein by reference.

BACKGROUND

Field of the Invention

The present invention relates to a vehicle lighting apparatus.

Background

In the related art, as a vehicle lighting apparatus, vehicle lighting apparatuses that use the contrast of light and display an image indicating information on a road surface have been proposed. In Japanese Patent No. 4059079, information formed by a reflection-type digital light deflection device is displayed on a road surface.

SUMMARY

However, in the vehicle lighting apparatus of the related art, when a variety of images are displayed on a road surface, since an imaging surface is not matched with the road surface, the distance between the image on the road surface and a lens at a near side of the image is greatly different from the distance between the image on the road surface and the lens at a far side of the image. Therefore, there is a problem in that a defocus occurs in which an image is formed at some position, but an image is not formed at frontward and rearward positions of the some position.

An object of an aspect of the present invention is to provide a vehicle lighting apparatus that is capable of clearly displaying an image on a road surface.

An aspect of the present invention is a vehicle lighting apparatus that emits light diagonally toward a road surface from a vehicle, the apparatus including: a light source; an image generation part that modulates light emitted from the light source and that generates an image; a light-focusing optical system that focuses light having the image generated by the image generation part; and a reflection part that reflects light focused by the light-focusing optical system and that projects reflected light on a road surface, wherein the reflection part has a reflection surface having a curvature that is gradually increased from a projection direction rearward side toward a projection direction frontward side.

According to the configuration, even when the reflection surface is a convex curved surface or is a concave curved surface, compared to a case in which light is reflected at a region that reflects light toward a far position from the vehicle, light is reflected at a region that reflects light toward a near position from the vehicle, the distance between a region where light is reflected on the reflection surface and a region where an image is formed on the road surface, which is an imaging surface, is shortened, and it is possible to prevent a defocus of the imaged light distribution pattern. Accordingly, it is possible to provide a vehicle lighting apparatus that is capable of clearly displaying an image on a road surface.

The vehicle lighting apparatus described above may include: a plurality of the reflection parts, each of which reflects light toward each of regions on the road surface having a different distance from each other; and a switch part that switches and arranges one of the plurality of the reflection parts to a light-receiving position of light emitted from the light-focusing optical system.

According to the configuration, the plurality of the reflection parts, each of which reflects light toward each of regions having a different distance from each other, are switched by the switch part and are arranged at the light-receiving position, and therefore, it is possible to clearly display an image at a position having a different distance on the road surface by each reflection part. Therefore, by switching the reflection part in accordance with an application, it is possible to clearly display an image at a position suitable for each application.

The vehicle lighting apparatus described above may include a return mirror that reflects light emitted from the light-focusing optical system toward the reflection part.

According to the configuration, since the light from the light-focusing optical system is reflected toward the reflection part by the return mirror, it is not necessary to arrange the light-focusing optical system in a direction that faces the reflection part, and it is possible to decrease the thickness in the vertical direction of the light-focusing optical system and decrease the size in the vertical direction of the vehicle lighting apparatus.

In the vehicle lighting apparatus described above, the reflection surface may have a concave shape and may be arranged at a latter part of an intermediate image formed by the light-focusing optical system.

According to the configuration, a reflection surface having a concave shape is employed, and it is possible to display a clear image on the road surface.

In the vehicle lighting apparatus described above, the reflection surface may have a convex shape and may be arranged at a former part of an intermediate image formed by the light-focusing optical system.

According to the configuration, a reflection surface having a convex shape is employed, and it is possible to display a clear image on the road surface.

The vehicle lighting apparatus described above may include: an object detection part that detects an object which is present at a frontward position of the vehicle; and a control part that controls the image of the image generation part and a switch mode of the reflection part in the switch part based on a detection condition of the object detection part.

According to the configuration, it is possible to change the direction and position of the display in accordance with frontward circumstances of the vehicle, and therefore, the information of the image displayed on the road surface can be easily understood by a person in the vicinity of the vehicle.

The vehicle lighting apparatus described above may employ a configuration in which the control part changes any one of or both of a direction of the image and a projection position of the image in accordance with frontward circumstances of the vehicle.

According to the configuration, it is possible to project necessary information on the road surface such that the information is easily seen in accordance with frontward circumstances of the vehicle.

According to the vehicle lighting apparatus of the aspect of the present invention, it is possible to provide a vehicle lighting apparatus that is capable of clearly displaying an image on a road surface.

BRIEF DESCRIPTION OF THE DRAWINGS

Part (a) of FIG. 4 is a perspective view showing a state in which a road surface is irradiated using a short-distance reflection part in the vehicle lighting apparatus according to the first embodiment. Part (b) of FIG. 4 is a plan view showing the state in which the road surface is irradiated using the short-distance reflection part in the vehicle lighting apparatus according to the first embodiment.

Part (a) of FIG. 5 is a perspective view showing a state in which a road surface is irradiated using a middle-distance reflection part in the vehicle lighting apparatus according to the first embodiment. Part (b) of FIG. 5 is a plan view showing the state in which the road surface is irradiated using the middle-distance reflection part in the vehicle lighting apparatus according to the first embodiment.

Part (a) of FIG. 6 is a perspective view showing a state in which a road surface is irradiated using a long-distance reflection part in the vehicle lighting apparatus according to the first embodiment. Part (b) of FIG. 6 is a plan view showing the state in which the road surface is irradiated using the long-distance reflection part in the vehicle lighting apparatus according to the first embodiment.

DESCRIPTION OF THE EMBODIMENTS

Hereinafter, a vehicle lighting apparatus according to an embodiment is described with reference to the drawings.

In the drawings used in the following description, there may be a case in which, for ease of understanding the features, the featured part is shown to be enlarged, and the dimension ratio of each component or the like is not always the same as an actual one.

First Embodiment

Figure 1:
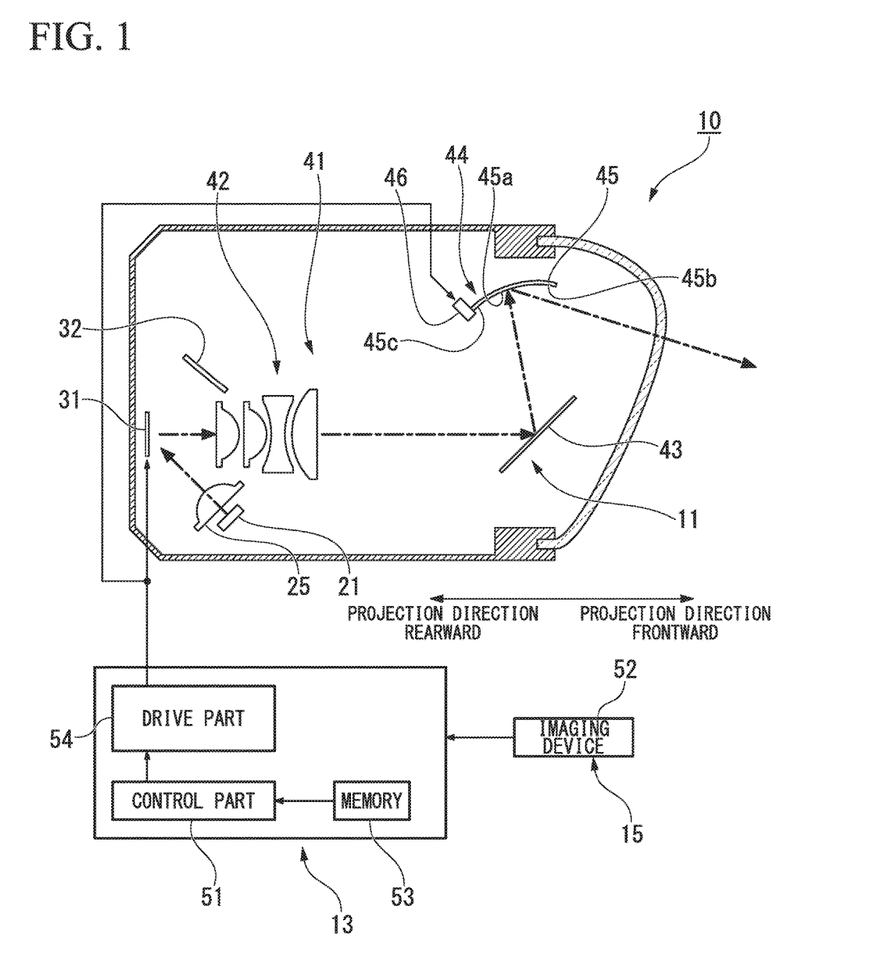
FIG. 1 is a schematic view of a vehicle lighting apparatus according to a first embodiment.

FIG. 1 is a schematic view of a vehicle lighting apparatus 10 according to a first embodiment.

The vehicle lighting apparatus 10 of the present embodiment is an apparatus that emits light, which has an image, diagonally toward a road surface from a vehicle.

As shown in FIG. 1, the vehicle lighting apparatus 10 includes a projection module 11 that illuminates a frontward direction of a vehicle, a control device 13 that controls the projection module 11, and an imaging device 15 that detects frontward circumstances and that transmits the frontward circumstances to the control device 13.

Figure 2:
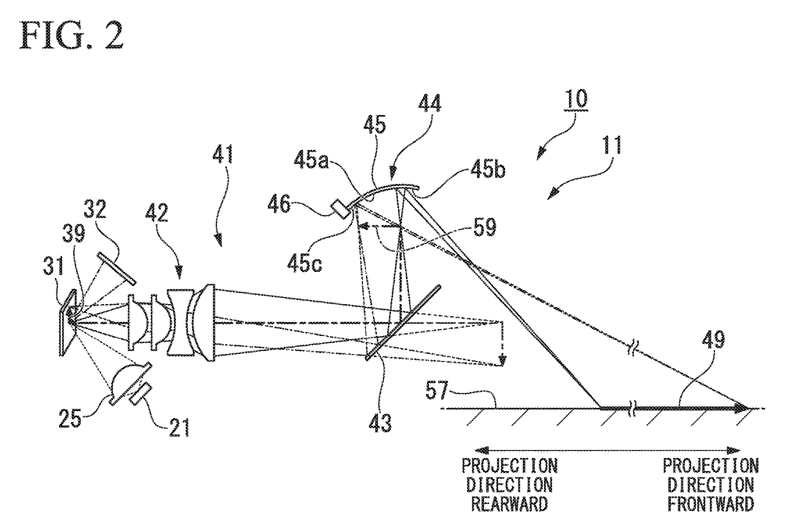
FIG. 2 is a schematic view of a projection module of the vehicle lighting apparatus according to the first embodiment.

FIG. 2 is a schematic view showing the projection module 11 of the present embodiment.

The projection module 11 of the present embodiment includes a light source 21, an incident optical system 25, an image generation part 31, and a projection optical system 41.

The light source 21 emits visible light. A light-emitting diode (LED) light source or a laser light source can be employed as the light source 21.

The incident optical system 25 is formed of one or more lenses and the like that focus light from the light source 21 and irradiate a reflection control surface of the image generation part 31.

The image generation part 31 modulates light emitted from the light source 21 and generates an image. In the present embodiment, the image generation part 31 is formed of a reflection-type digital light deflection device (DMD, Digital Mirror Device). The image generation part 31 formed of the reflection-type digital light deflection device has the reflection control surface configured by arranging a plurality of mirror elements capable of being slanted.

A slant angle of each of the plurality of mirror elements of the image generation part 31 is controlled to a reflection side or a light shield side by a signal from the control device 13. The image generation part 31 generates a reflection pattern (image) 39 having an arbitrary shape by reflection light of the plurality of mirror elements slanted to the reflection side. In the example shown in FIG. 2, the image generation part 31 generates a reflection pattern 39 having an arrow shape.

A light shield member 32 that blocks light from each mirror element slanted to the light shield side is provided on the vehicle lighting apparatus 10.

The projection optical system 41 illuminates a frontward direction of the vehicle with the reflection pattern 39 generated by the image generation part 31 as a light distribution pattern 49. The projection optical system 41 includes a light-focusing optical system 42, a return mirror 43, and a reflection device 44.

The light-focusing optical system 42 is formed of one or more lenses and the like. The light-focusing optical system 42 illuminates a reflection part 45 of the reflection device 44 with the reflection pattern 39 generated by the image generation part 31 via the return mirror 43. The light-focusing optical system 42 focuses the reflection pattern 39 emitted from the image generation part 31 and forms an intermediate image 59.

The return mirror 43 is a mirror that reflects light from the light-focusing optical system 42 toward the reflection part 45.

Figure 3:
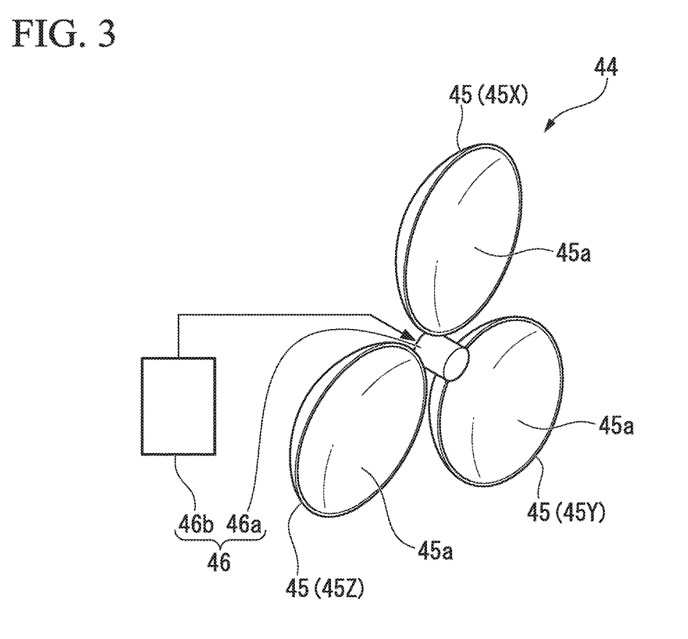
FIG. 3 is a perspective view showing a switch part of the vehicle lighting apparatus according to the first embodiment.

FIG. 3 is a perspective view of the reflection device 44.

The reflection device 44 has a plurality of (three in the present embodiment) reflection parts 45 and a switch part 46. The reflection part 45 reflects light focused by the light-focusing optical system 42 toward a road surface 57. The switch part 46 has a shaft part 46a and a drive part 46b that drives the shaft part 46a to be rotated around the shaft.

A plurality of reflection parts 45 are fixed to the shaft part 46a at even intervals along a circumferential direction with respect to the shaft center of the shaft part 46a. The switch part 46 switches and arranges one of the plurality of the reflection parts 45 to a light-receiving position at which light emitted from the light-focusing optical system 42 is received in accordance with the rotation of the shaft part 46a by the drive part 46b.

In FIG. 1 and FIG. 2, only one reflection part 45 of the plurality of reflection parts 45 that is arranged at the light-receiving position is shown.

The reflection part 45 is a concave reflector used for an expansion projection. The reflection part 45 has a reflection surface 45a. The reflection part 45 reflects light focused by the light-focusing optical system 42 at the reflection surface 45a and projects reflected light onto a predetermined region of the road surface 57. The reflection surface 45a has a concave shape formed of an aspherical free-form surface.

The reflection surface 45a is arranged at a latter part of the intermediate image 59 formed by the light-focusing optical system 42. Accordingly, light forms an image at a former part side of the reflection surface 45a, is incident on the reflection surface 45a having a concave shape while extending in a diffusion direction, and is reflected by the reflection surface 45a to thereby be focused again.

The "former part" and the "latter part" mean a sequence relationship (that is, an upstream side and a downstream side in an optical path) along a transmission path of light and do not mean the arrangement of each part in the vehicle lighting apparatus 10.

A projection direction frontward region 45b of the reflection surface 45a reflects light toward the road surface 57 on a vehicle near side. A projection direction rearward region 45c of the reflection surface 45a reflects light toward the road surface 57 on a vehicle far side. The reflection surface 45a is formed to have a curvature that is continuously changed from the projection direction rearward region 45c toward the projection direction frontward region 45b in accordance with the distance to a projection target (a near position from the vehicle to a far position from the vehicle of the road surface 57). That is, the reflection surface 45a has a curvature that is gradually increased from a projection direction rearward side toward a projection direction frontward side. Thereby, compared to a case in which light is reflected at the projection direction rearward region 45c that reflects light toward a far position from the vehicle, light is reflected at the projection direction frontward region 45b that reflects light toward a near position from the vehicle, the distance between a region where light is reflected on the reflection surface 45a and a region where an image is formed on the road surface 57, which is an imaging surface, is shortened, and it is possible to prevent a defocus of the imaged light distribution pattern 49.

Figure 4:
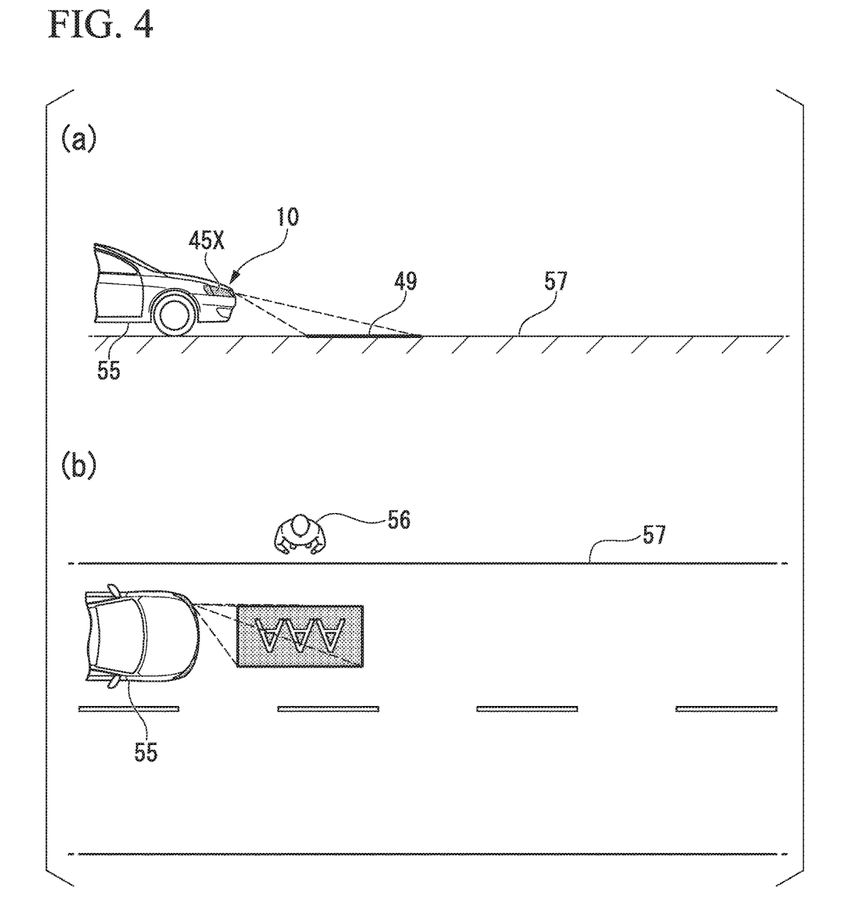
Figure 5:
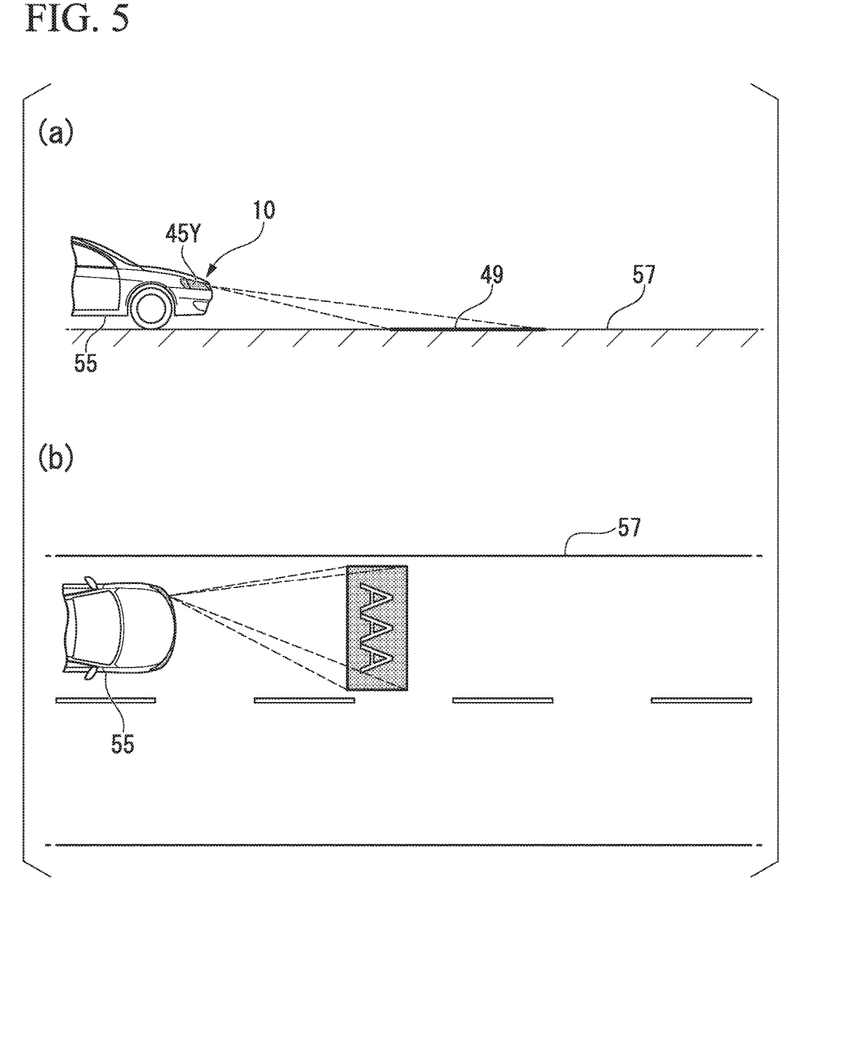
Figure 6:
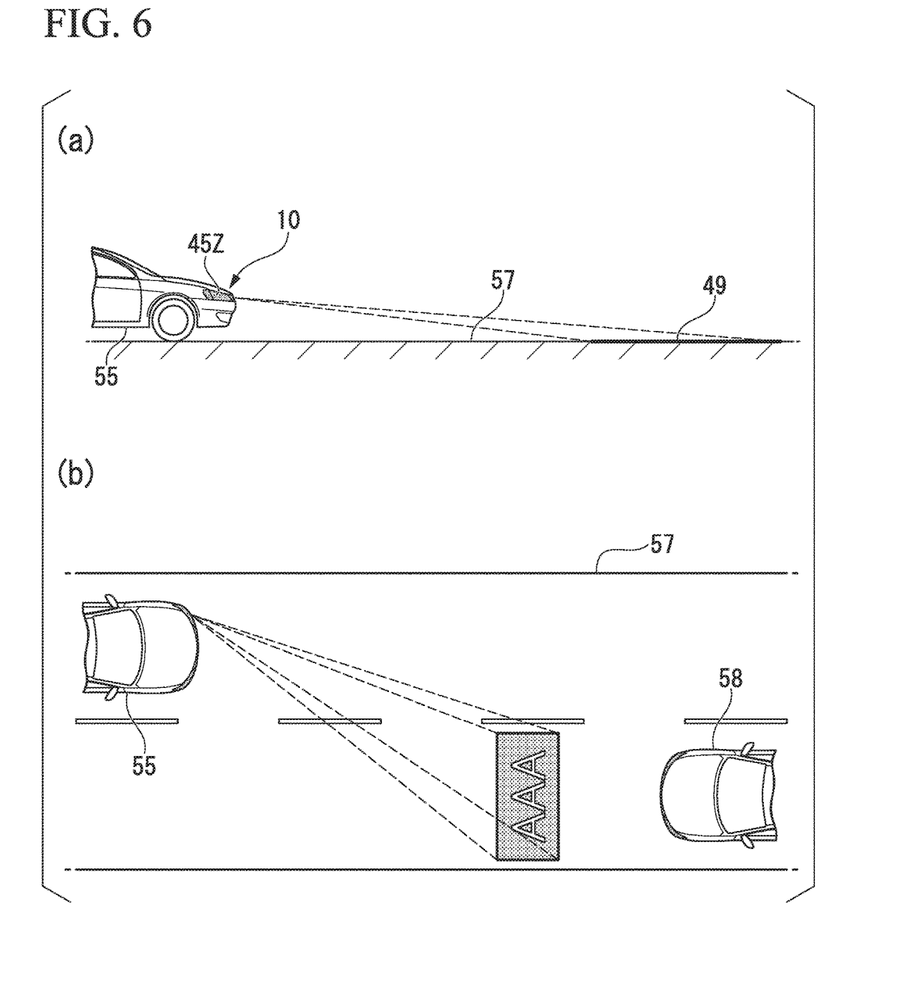

As shown in FIG. 3, the reflection device 44 of the present embodiment has a short-distance reflection part 45X, a middle-distance reflection part 45Y, and a long-distance reflection part 45Z. The reflection surface 45a of each of the reflection parts 45X, 45Y, and 45Z is set so as to reflect light toward each of regions on the road surface 57 having a different distance from one another. Each reflection surface 45a of the short-distance reflection part 45X, the middle-distance reflection part 45Y, and the long-distance reflection part 45Z is formed such that as the reflection surface 45a has a shorter distance to the position which is irradiated with reflection light, the reflection surface 45a has a curved surface having a larger average curvature. Part (a) and part (b) of FIG. 4 show a state in which the road surface 57 is irradiated with the light distribution pattern 49 using the short-distance reflection part 45X. Part (a) and part (b) of FIG. 5 show a state in which the road surface 57 is irradiated with the light distribution pattern 49 using the middle-distance reflection part 45Y. Part (a) and part (b) of FIG. 6 show a state in which the road surface 57 is irradiated with the light distribution pattern 49 using the long-distance reflection part 45Z.

With reference back to FIG. 1, the configuration of the vehicle lighting apparatus 10 is described.

The imaging device 15 that controls the projection module 11 has an object detection part 52 that detects, by capturing an image of a frontward direction of a vehicle and processing the image, an object that is present in the frontward direction of the vehicle and transmits a detection signal to a control part 51.

On the other hand, the control device 13 has a configuration that is capable of performing a process of controlling a slant mode of the mirror element of the image generation part 31 to thereby form an image and, at the same time, arranging a reflection part 45 selected from a plurality of reflection parts 45 by the switch part 46 to a light-receiving position from the light-focusing optical system 42.

The control device 13 has a memory 53 in which control information of a variety of images and the like are set in advance, the control part 51 that generates a control signal based on information from the memory 53 and a signal from the imaging device 15, and a drive part 54 that drives part of or all of the light source 21, the image generation part 31, and the reflection device 44 based on the control signal.

The control part 51 controls the image by the slant mode of each mirror element of the image generation part 31 via the drive part 54 and controls a switch mode in which any of the reflection parts 45 of the reflection device 44 is arranged at the light-receiving position based on a detection condition of the object detection part 52 or an input operation of a driver and the like.

In such a vehicle lighting apparatus 10, as shown in part (a) and part (b) of FIG. 4, when the presence of a pedestrian 56 at a road shoulder in the vicinity of the frontward position of the vehicle is detected by the imaging device 15, the short-distance reflection part 45X is switched to and arranged at the light-receiving position in the reflection device 44. In the image generation part 31, a transversely directed image that is adapted for the pedestrian 56 at the road shoulder is generated, and light from the light source 21 is emitted from the light-focusing optical system 42. Thereby, it is possible to display an image having an appropriate direction when seen from the pedestrian 56, on the road surface 57.

For example, when indicating that right of way is given to a pedestrian 56 who will cross the road, it is possible to display an image in a state where characters are rotated such that the display is appropriate when seen from the pedestrian 56 at the road shoulder.

As shown in part (a) and part (b) of FIG. 5, when a road surface display is requested by the input operation of the driver and the like, the middle-distance reflection part 45Y is switched to and arranged at the light-receiving position in the reflection device 44. In the image generation part 31, an image that is directed in the near side and that is adapted for the driver and the like with respect to information requested by the driver and the like is generated, and light from the light source 21 is emitted from the light-focusing optical system 42. Thereby, it is possible to display an image having an appropriate direction when seen from the driver, on the road surface 57.

For example, information such as a legal speed, route guidance, and warning of a frontward obstacle in an appropriate direction when seen from the driver can be displayed on the road surface 57 for the driver at a middle-distance position of the road surface 57.

As shown in part (a) and part (b) of FIG. 6, when the presence of an oncoming vehicle 58 is detected by the imaging device 15, the long-distance reflection part 45Z is switched to and arranged at the light-receiving position in the reflection device 44. In the image generation part 31, an inversely directed image that is adapted for the driver of the oncoming vehicle 58 is generated, and light from the light source 21 is emitted from the light-focusing optical system 42. Thereby, it is possible to display an image having an appropriate direction when seen from the driver of the oncoming vehicle 58, on the road surface 57.

For example, when notifying a far oncoming vehicle 58 of a pedestrian 56 who is crossing the road and the like, it is possible to display an image in a state where characters are inverted such that the display is appropriate when seen from the oncoming vehicle 58.

According to the vehicle lighting apparatus 10 of the present embodiment, the reflection part 45 that reflects light having an image as the reflection pattern 39 toward the road surface 57 is formed to have a curvature that is continuously changed in accordance with the distance to a projection target (a near position from the vehicle to a far position from the vehicle of the road surface). Thereby, it is possible to clearly display an image on the road surface 57, and it is possible to draw a high-quality image without a defocus.

According to the vehicle lighting apparatus 10 of the present embodiment, the plurality of the reflection parts 45, each of which reflects light toward each of regions having a different distance from each other, can be switched by the switch part 46 and can be arranged at the light-receiving position. By switching the reflection part 45 in accordance with an application, it is possible to provide a vehicle lighting apparatus 10 that clearly displays an image at a position suitable for each application. Further, when emitting reflection light to a long distance, it is possible to prevent the light from diffusing and to prevent the illumination intensity from being decreased.

The vehicle lighting apparatus 10 of the present embodiment includes the object detection part 52 and the control part 51 that controls the image of the image generation part 31 and a switch mode of the reflection part 45 based on a detection condition of the object detection part 52. Therefore, it is possible to change the direction and position of the display in accordance with frontward circumstances of the vehicle, and the information of the image displayed on the road surface can be easily understood by a person in the vicinity of the vehicle.

In the vehicle lighting apparatus 10 of the present embodiment, the control part 51 changes the image generated on the image generation part 31 and changes the direction of the image in accordance with frontward circumstances of the vehicle. Further, in the vehicle lighting apparatus 10 of the present embodiment, the control part 51 selects any of the short-distance reflection part 45X, the middle-distance reflection part 45Y, and the long-distance reflection part 45Z and thereby changes the projection position of the image in accordance with frontward circumstances of the vehicle. Thereby, it is possible to project necessary information on the road surface such that the information is easily seen in accordance with frontward circumstances of the vehicle.

The first embodiment described above can be arbitrarily changed without departing from the scope of the invention. For example, the combination of the selection from the short-distance reflection part 45X, the middle-distance reflection part 45Y, and the long-distance reflection part 45Z and the direction of the image is not limited. For example, it is possible to display a transversely directed image on the road surface 57 by the long-distance reflection part 45Z.

According to the vehicle lighting apparatus 10 of the present embodiment, since the light from the light-focusing optical system 42 is reflected toward the reflection part 45 by the return mirror 43, it is not necessary to arrange the light-focusing optical system 42 in a direction that faces the reflection part 45. Thereby, it is possible to decrease the thickness in the vertical direction of the light-focusing optical system 42 and decrease the size in the vertical direction of the vehicle lighting apparatus 10. Thereby, it is possible to easily downsize a housing of the vehicle lighting apparatus 10.

Figure 7:
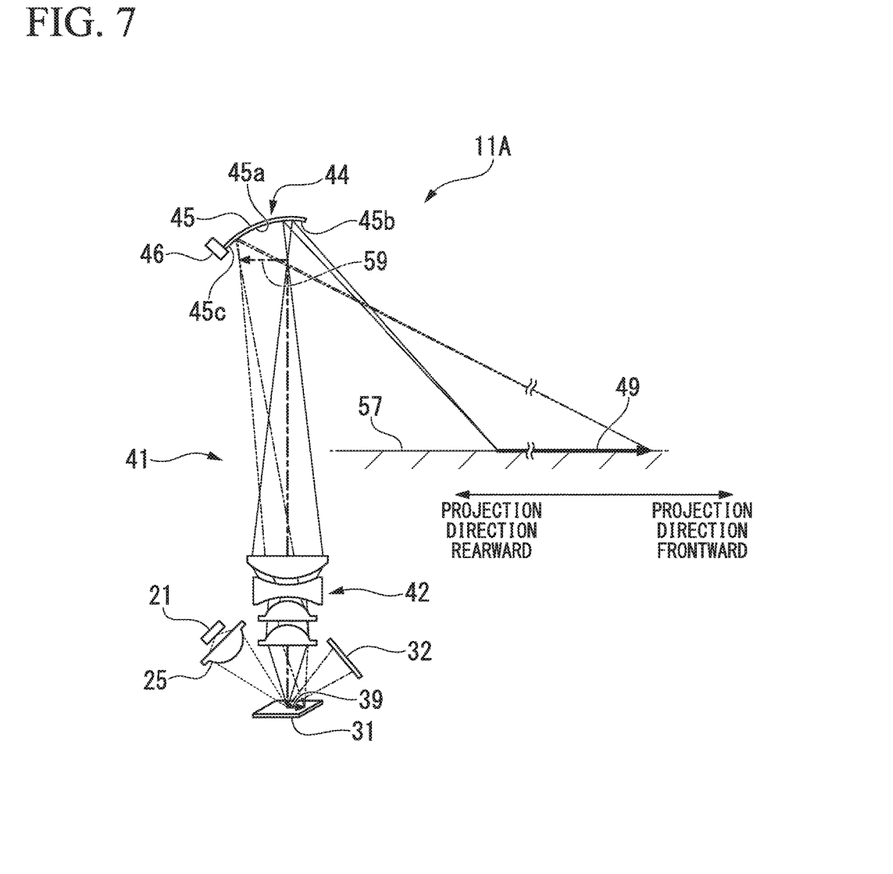
FIG. 7 is a schematic view of a projection module of a vehicle lighting apparatus according to a modified example of the first embodiment.

The return mirror 43 may be omitted. FIG. 7 shows a projection module 11A of a modified example that is adoptable in the present embodiment. The projection module 11A is different in that the projection module 11A does not include the return mirror 43 compared to the embodiment described above. According to the present modified example, it is possible to reduce the number of components and to provide a low-cost vehicle lighting apparatus 10.

Second Embodiment

Figure 8:
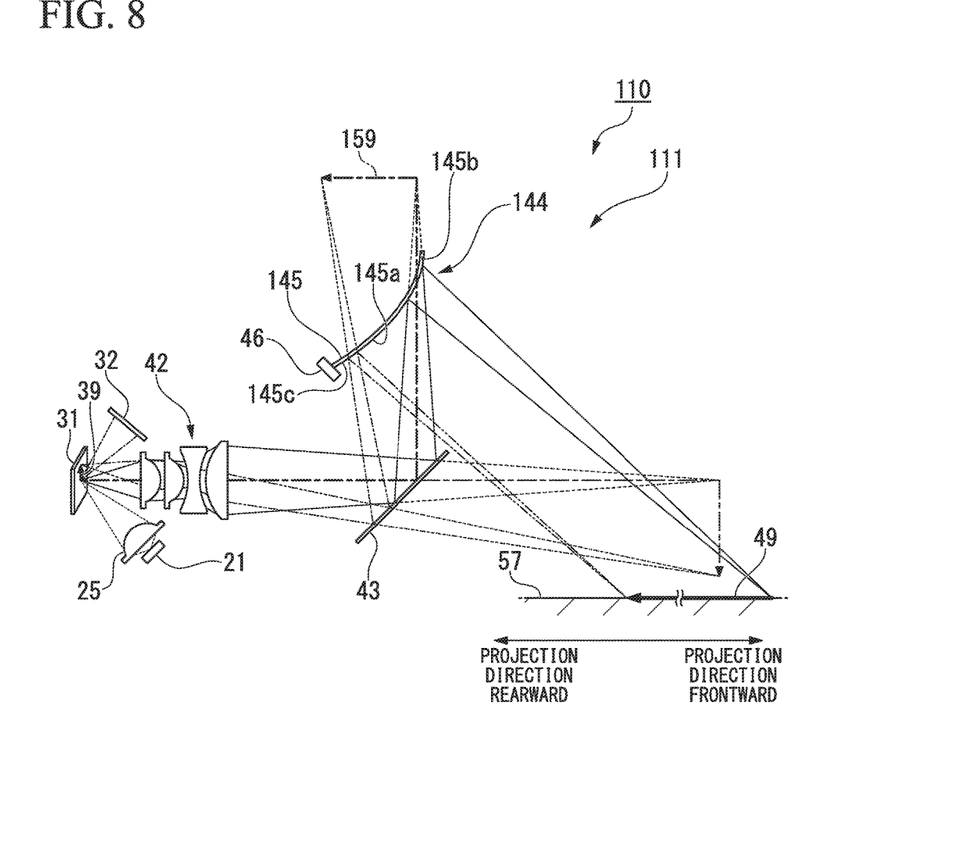
FIG. 8 is a schematic view of a projection module of a vehicle lighting apparatus according to a second embodiment.

FIG. 8 is a schematic view showing a projection module 111 of a vehicle lighting apparatus 110 of a second embodiment.

The same reference numerals are given to constituents having the same configuration as those of the embodiment described above, and description of the constituents is omitted.

The vehicle lighting apparatus 110 of the present embodiment includes a reflection device 144 having a reflection part 145. The reflection part 145 has a reflection surface 145a having a convex shape. The reflection surface 145a is arranged at a former part of an intermediate image 159 formed by the light-focusing optical system 42. Accordingly, light is incident on the reflection surface 145a having a convex shape while being focused, the distance between the reflection surface and the imaging surface is adjusted by the reflection surface 145a, and the light is reflected in the frontward direction.

The reflection surface 145a having a convex shape has a curvature that is gradually increased from a projection direction rearward side toward a projection direction frontward side.

A projection direction frontward region 145b of the reflection surface 145a reflects light toward the road surface 57 on a vehicle far side. A projection direction rearward region 145c of the reflection surface 145a reflects light toward the road surface 57 on a vehicle near side. The reflection surface 145a is formed to have a curvature that is continuously changed from the projection direction rearward region 145c toward the projection direction frontward region 145b in accordance with the distance to a projection target (a near position from the vehicle to a far position from the vehicle of the road surface 57). That is, the reflection surface 145a has a curvature that is gradually increased from a projection direction rearward side toward a projection direction frontward side. Thereby, compared to a case in which light is reflected at the projection direction frontward region 145b that reflects light toward a far position from the vehicle, light is reflected at the projection direction rearward region 145c that reflects light toward a near position from the vehicle, the distance between a region where light is reflected on the reflection surface 145a and a region where an image is formed on the road surface 57, which is an imaging surface, is shortened, and it is possible to prevent a defocus of the imaged light distribution pattern 49.

In any of the embodiments described above, the vehicle lighting apparatus 10 as described above may be provided separately from a headlight or may be incorporated in a headlight.

The embodiments described above are described using an example in which a reflection-type digital light deflection device is used as the image generation part 31; however, a transmission-type spatial modulator such as liquid crystal, a drawing apparatus that combines a scanning mirror and phosphor, and the like may be used.

The invention claimed is:

1. A vehicle lighting apparatus that emits light diagonally toward a road surface from a vehicle, the apparatus comprising:
a light source;
an image generation part that modulates light emitted from the light source and that generates an image;
a light-focusing optical system that focuses light having the image generated by the image generation part; and
a reflection part that reflects light focused by the light-focusing optical system and that projects reflected light on a road surface,
wherein the reflection part has a reflection surface having a curvature that is gradually increased from a projection direction rearward side toward a projection direction frontward side, and
the reflection surface has a convex shape and is arranged at a former part of an intermediate image formed by the light-focusing optical system.

2. A vehicle lighting apparatus that emits light diagonally toward a road surface from a vehicle, the apparatus comprising:
a light source;
an image generation part that modulates light emitted from the light source and that generates an image;
a light-focusing optical system that focuses light having the image generated by the image generation part;
a plurality of reflection parts that reflects light focused by the light-focusing optical system and that projects reflected light on a road surface,
each of the reflection parts reflects light toward each of regions on the road surface having a different distance from each other; and
a switch part that switches and arranges one of the plurality of reflection parts to a light-receiving position of light emitted from the light-focusing optical system,
wherein each of the reflection parts has a reflection surface having a curvature that is gradually increased from a projection direction rearward side toward a projection direction frontward side.

3. The vehicle lighting apparatus according to claim 2, comprising
a return mirror that reflects light emitted from the light-focusing optical system toward the reflection parts.

4. The vehicle lighting apparatus according to claim 2, wherein the reflection surface has a concave shape and is arranged at a latter part of an intermediate image formed by the light-focusing optical system.

5. The vehicle lighting apparatus according to claim 2, wherein the reflection surface has a convex shape and is arranged at a former part of an intermediate image formed by the light-focusing optical system.

6. The vehicle lighting apparatus according to claim 2, comprising:
an object detection part that detects an object which is present at a frontward position of the vehicle; and
a control part that controls the image of the image generation part and a switch mode of the reflection part in the switch part based on a detection condition of the object detection part.

7. The vehicle lighting apparatus according to claim 6, wherein the control part changes any one of or both of a direction of the image and a projection position of the image in accordance with frontward circumstances of the vehicle.

* * * * *